US00RE40481E

(19) United States
(12) Reissued Patent
Borla

(10) Patent Number: US RE40,481 E
(45) Date of Reissued Patent: Sep. 9, 2008

(54) AIR FILTRATION DEVICE FOR INTERNAL COMBUSTION ENGINE

(75) Inventor: Alexander Borla, Camarillo, CA (US)

(73) Assignee: Borla Performance Industries, Inc., Oxnard, CA (US)

(21) Appl. No.: 11/586,490
(22) Filed: Oct. 25,

(22) Filed: 2006

Related U.S. Patent Documents

Reissue of:
(64) Patent No.: 6,808,552
Issued: Oct. 26, 2004
Appl. No.: 10/271,412
Filed: Oct. 15, 2002

U.S. Applications:
(60) Provisional application No. 60/329,342, filed on Oct. 15, 2001.

(51) Int. Cl.
*B01D 29/33* (2006.01)
*B01D 46/02* (2006.01)

(52) U.S. Cl. ..... 95/273; 55/385.3; 55/497; 55/503; 55/509; 55/521; 55/529; 210/448; 210/452; 210/497.3

(58) Field of Classification Search ..... 95/273, 95/285–287; 55/323, 332, 333, 336, 363, 55/385.3, 463, 497, 503, 505, 507, 509, 521, 55/527, 528, 529; 210/435, 446, 448–452, 210/493.1, 493.4, 497.01, 497.3
See application file for complete search history.

(56) References Cited

U.S. PATENT DOCUMENTS

| | | | | | |
|---|---|---|---|---|---|
| 153,535 | A | * | 7/1874 | Cable | 210/317 |
| 439,091 | A | * | 10/1890 | Bach | 210/449 |
| 1,398,685 | A | * | 11/1921 | Gordon | 55/293 |
| 1,530,163 | A | * | 3/1925 | Florenza | 210/449 |
| 1,887,052 | A | * | 11/1932 | Wendeln | 55/466 |
| 2,087,688 | A | * | 7/1937 | Johnson | 55/486 |
| 4,003,836 | A | * | 1/1977 | Stearns et al. | 210/247 |
| 4,018,580 | A | * | 4/1977 | Burkholz et al. | 55/321 |
| 4,032,455 | A | * | 6/1977 | Kale | 210/435 |
| 4,033,836 | A | * | 7/1977 | Holmes | 205/374 |
| 4,039,308 | A | * | 8/1977 | Schiff | 55/505 |
| 4,065,276 | A | * | 12/1977 | Nakaya et al. | 96/380 |
| 4,261,710 | A | * | 4/1981 | Sullivan | 95/282 |
| 4,389,227 | A | * | 6/1983 | Hobbs | 55/306 |
| 4,410,341 | A | * | 10/1983 | Edwards et al. | 55/482 |
| 4,414,110 | A | * | 11/1983 | Geel et al. | 210/321.8 |
| 4,699,715 | A | * | 10/1987 | Lee, II | 210/448 |
| 5,106,397 | A | * | 4/1992 | Jaroszczyk et al. | 96/388 |
| 5,178,656 | A | * | 1/1993 | Schott | 55/450 |
| 5,522,909 | A | * | 6/1996 | Haggard | 55/327 |
| 5,549,722 | A | * | 8/1996 | Zemaitis et al. | 55/463 |
| 5,549,724 | A | * | 8/1996 | Mochida | 55/521 |
| D401,597 | S | * | 11/1998 | Shelton et al. | D15/5 |
| D401,942 | S | * | 12/1998 | Shelton et al. | D15/5 |
| D403,414 | S | * | 12/1998 | Shelton et al. | D23/365 |
| D403,416 | S | * | 12/1998 | Shelton et al. | D23/365 |
| 5,888,260 | A | * | 3/1999 | Sica | 55/331 |
| 6,397,842 | B1 | * | 6/2002 | Lee | 128/203.26 |
| 6,508,052 | B1 | * | 1/2003 | Snyder et al. | 60/39.092 |

* cited by examiner

*Primary Examiner*—Frank M. Lawrence
(74) *Attorney, Agent, or Firm*—Reising, Ethington, Barnes, Kisselle, P.C.; William J. Waugaman

(57) ABSTRACT

Filtration method and device for filtering solid contaminants from a stream of a flowing fluid such as internal combustion engine intake air. An imperforate housing has a tubular inlet exiting at its downstream end into a conically divergent first wall section terminating in a maximum diameter apex. A convergent second wall section terminates at a housing outlet opening of greater diameter than that of the housing inlet. A perforate filter element disposed within the housing conical portions has an exterior configuration generally complimental to the housing interior, and thus has a first generally conical divergent section, and a second generally conical downstream section convergent from a maximum diameter apex of the filter element and defining the filter device outlet. The housing and filter element define therebetween first and second frustoconical annular fluid flow chambers of successively diminishing cross-sectional radial thickness in the direction of downstream fluid flow.

45 Claims, 2 Drawing Sheets

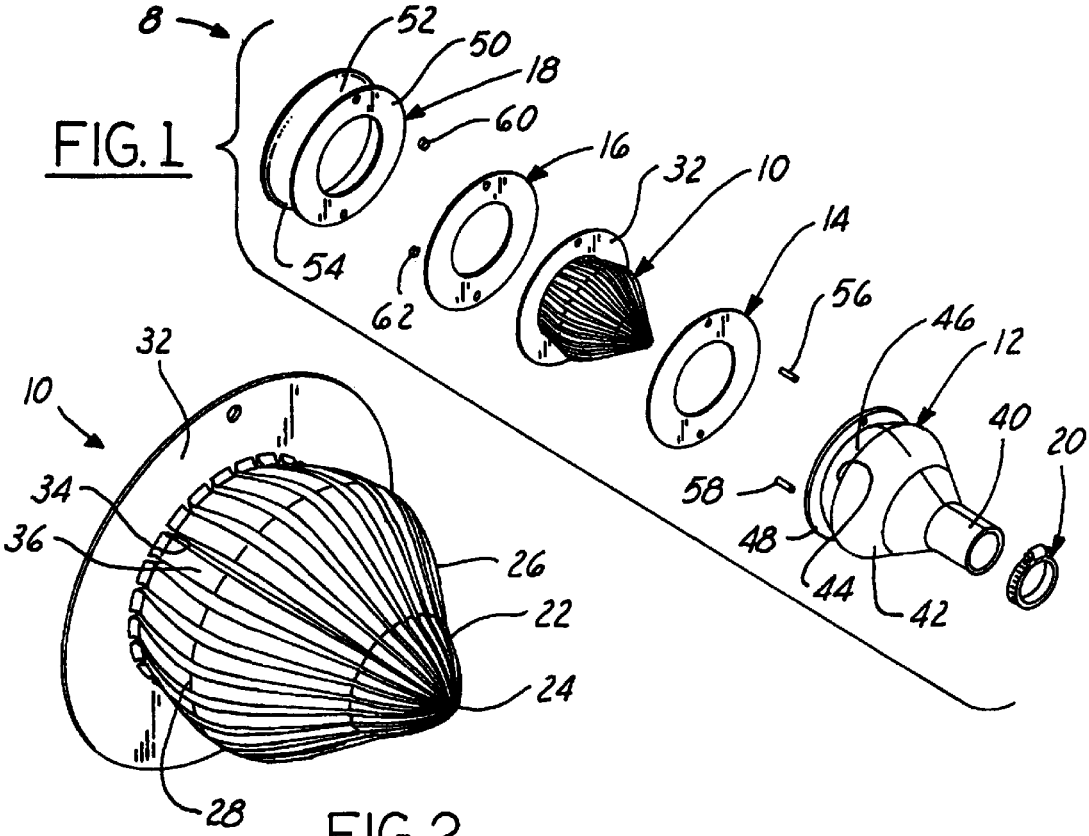
FIG. 1
FIG. 2
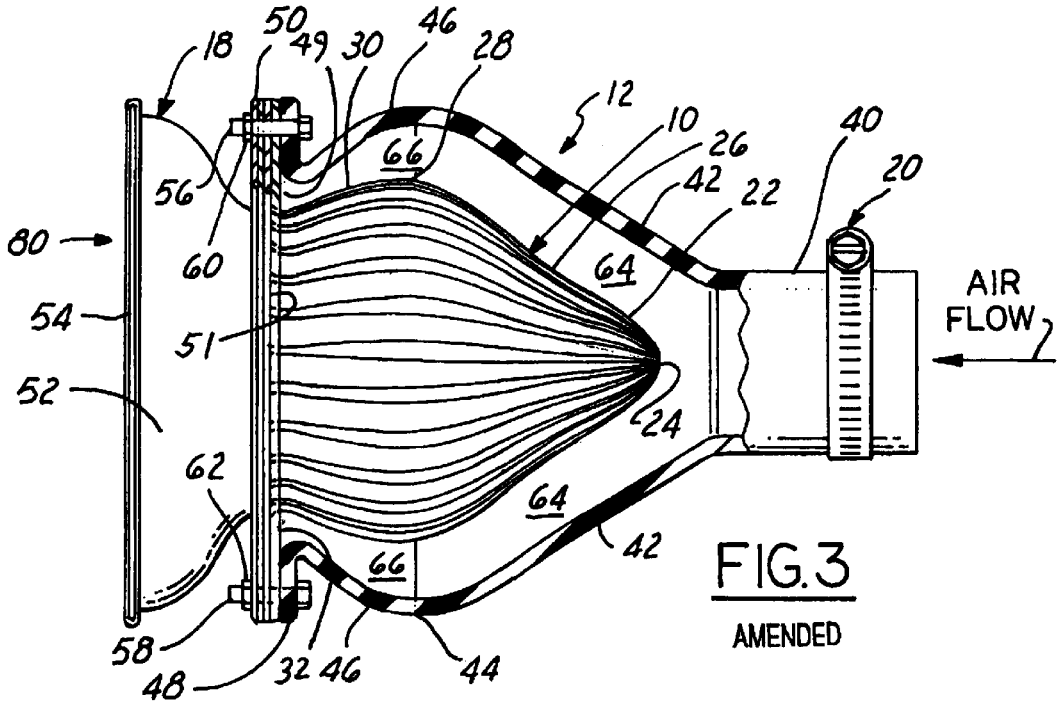
FIG. 3
AMENDED

AIR FILTRATION DEVICE FOR INTERNAL COMBUSTION ENGINE

Matter enclosed in heavy brackets [ ] appears in the original patent but forms no part of this reissue specification; matter printed in italics indicates the additions made by reissue.

This is a United States regular utility patent application filed pursuant to 35 U.S.C. §111 (a) and claiming the benefit under the provisions of 35 U.S.C. §119 (e) (1) of the priority of U.S. provisional patent application Ser. No. 60/329,342 filed Oct. 15, 2001 pursuant to 35 U.S.C. §111 (b).

FIELD OF THE INVENTION

This invention relates to fluid filtration devices of the type wherein a fluid-permeable filter media is operably disposed in flow-through filtering relationship with a fluid medium, and more particularly to an air filtration device constructed for use with the air intake manifold of an internal combustion engine such as reciprocating piston and rotary engines, such as those used in automobiles, trucks, motorcycles, small engine vehicles and lawn and garden engine-powered appliances, as well as larger turbine engines used on tanks, helicopters and the like, and power generating station gas turbines.

BACKGROUND OF THE INVENTION

There are many types of air filtration devices for internal combustion engines on the market today. One example is an automotive air filtration unit offered on the Ford Mustang model year 2000 in which a rectangular cross section housing is provided at the upstream inlet end of the engine air intake manifold located on the left side fender well under the hood of the vehicle. This box-like housing has disposed within it an air filtration element in the form of a frustoconically shaped filter media with a blunt, imperforate nose of say three inches in diameter at its leading end. This filter media diverges from its nose in a conical shape with a straight taper to a diameter of about four or five inches at its rear end, and is approximately six to seven inches long. The conical surface of this filter is pleated, and the smaller diameter, blunt nose of the filter media is oriented as the leading end of the filter, thus facing upstream in the air flow stream being engine-drawn into the intake manifold.

One of the problems discovered with this prior art filter is caused by the nonconformance geometrically between the general conical shape of the filter media versus the generally rectangular shape of the enclosing housing. This configuration presents a relatively high level of air deflection and creates turbulence and eddies that also contribute to deposit collection of contaminating particles in certain areas of the housing, thereby reducing the efficiency of the filter relative to air flow capacity. Also, the audible noise level associated with such air filtration devices is objectionably high in some instances and under certain conditions. The aforementioned filter-housing configuration also reduces the air flow velocity through the filter due to the air flow deflections and turbulence effects. Conditions of velocity changes in air flow, depending on the engine demand, also typically change the interface angle between the impinging air and the filter surface, further reducing optimum performance of the filter.

Other examples of prior art automotive air filtering devices are those shown in the U.S. design patents DES. No. 401,597; DES. No. 401,942; DES. No. 403,414 and DES. No. 403,416.

OBJECTS OF THE INVENTION

Accordingly, among the objects of the present invention are to provide an improved air filtration method and device for performing such method, and an improved method of making such devices for use with internal combustion engines that achieves increasing air flow and air velocity through the air filtering system while maintaining a high level of air filtration, that operates with a lower level of air deflection in the air stream presented to the filter media due to unique and cooperative geometrical shapes of the filter media and the enclosing housing, wherein such cooperative shapes also create several thousand direct paths for the air to flow through the filter media without deflection, that enhances proper air flow direction and obtains higher operating air velocities than conventional air filtration devices, that reduces the audible noise level from that associated with prior air filtration devices, and which is simple and economical in construction, reliable in operation which provides a long service life.

SUMMARY OF THE INVENTION

In general, and by way of summary description and not by way of limitation, the present invention accomplishes one or more of the foregoing objects by providing an improved air filtration method and device for filtering solid contaminants from a stream of flowing fluid wherein a housing is provided having a tubular *first fluid flow opening at one end, e.g. an* inlet exiting at its downstream end into a conically divergent first wall section having a first taper angle of divergence and terminating in a maximum diameter apex. The housing wall taper then reverses and thus continues in a convergent second wall section having a second angle of taper. The second wall section terminates at a housing *second fluid flow opening of greater diameter than the first fluid flow opening e.g. an* outlet opening of greater diameter than the diameter of the inlet opening at the tubular inlet. A filter element is disposed within the interior chamber defined by the conical portions of the housing and has an exterior configuration generally [complimental] *complemental* to that of the interior of the housing. The filter element thus has a first generally conical section divergent *from the first fluid flow opening* at a third taper angle greater than the first taper angle of the housing and a second generally conical [downstream] section convergent at a fourth taper angle from a maximum diameter apex of the filter [to an] *toward the second fluid flow opening, preferably the* outlet at an angle of convergence less than the second taper angle.

The filter housing and filter element thereby define first and second frustoconical annular chambers of successively diminishing cross-sectional radial thickness in the direction [of] *from the first fluid flow opening to the second fluid flow opening, e.g. in the* downstream fluid flow *direction for one embodiment*.

In one embodiment the housing is constructed of flexible material such as rubber or the like and is molded as a one-piece unit.

In another embodiment the housing comprises a two-piece unit with half sections that mate together along mounting flanges provided at the side edges of each of the half sections. The housing is made of a plastic material having at least semi-rigid characteristics with sufficient strength to withstand in operation substantial pressure differences between that of the interior air stream and the exterior ambient atmosphere.

In both embodiments the filter element is radially corrugated to provide axially extending corrugations spaced generally uniformly around the entire circumference of the filter element and extending substantially for its entire axial length.

BRIEF DESCRIPTION OF THE DRAWINGS

Further objects, features and advantages of the present invention will become apparent from the following detailed description of the best mode presently known to the inventor for making and using the invention, from the appended claims and from the accompanying drawings (which are to engineering scale unless otherwise indicated) wherein:

FIG. 1 is an exploded perspective view of a first embodiment of an air filtration device constructed for use with an automotive internal combustion engine in performing the method of the invention.

FIG. 2 is a perspective view of the improved filter element itself employed in the air filtration device of FIG. 1, looking from a point upstream of the filter leading end.

FIG. 3 is a side view of the air filter, housing and other components of the assembly shown in FIG. 1 shown in assembled condition and with the housing cut away to better illustrate the filter element therein.

DETAILED DESCRIPTION OF PREFERRED EMBODIMENTS

Figure 4:
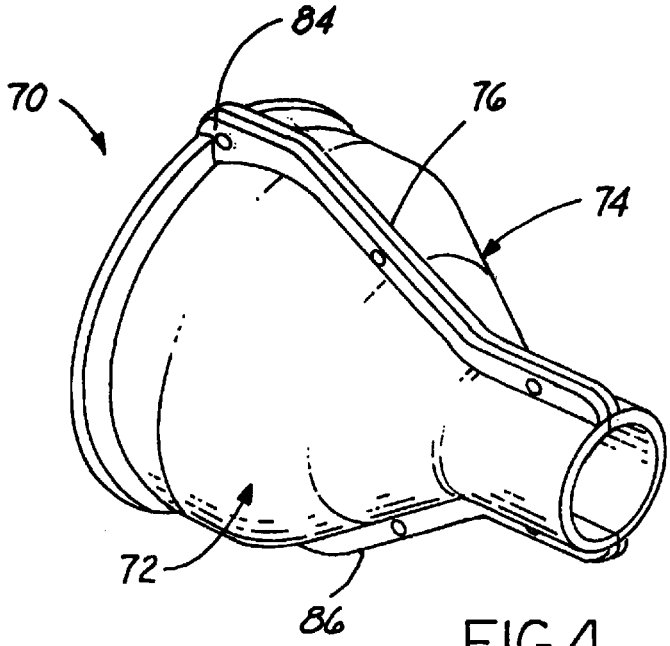
FIG. 4 is a perspective view of a second embodiment encapsulating housing for use in the filter assembly of FIG. 1 in place of the housing shown in FIGS. 1 and 3.

Referring in more detail to the accompanying drawings, FIG. 1 illustrates in exploded perspective simplified format a first embodiment of an air filtration device 8 in accordance with the invention that comprises in assembly the following components:

| Reference Numeral | Name of Component |
|---|---|
| 10 | Air filter element |
| 12 | Filter housing |
| 14 | Upstream gasket |
| 16 | Downstream gasket |
| 18 | Mounting plate/collar |
| 20 | Hose clamp |

Air filter element 10 is shown by itself in FIG. 2 in a view enlarged over that of FIG. 1, and also appears in side elevation in FIG. 3. In accordance with one principal feature of the present invention, filter element 10 has a generally conical configuration made up of a perforate pointed nose section 22 that is divergent from its leading apex edge 24 that faces upstream into the air flow stream. Nose section 22 merges with a generally straight tapered conical mid-section 26 that is again divergent in the downstream direction relative to air flow. Mid-section 26 terminates at its maximum diameter at an apex junction 28 where it is integrally joined to an oppositely tapered trailing section 30 that in turn terminates at its downstream end in a radially outwardly extending mounting flange 32. The entire axial length of filter 10 from nose 24 to flange 32 is perforate (air pervious) and radially corrugated, i.e., it is preferably made up of angularly evenly spaced corrugations each of generally V-shaped cross-section as schematically represented in FIGS. 1–3 by a root apex 34 and corresponding peak apex 36.

As will be evident from the foregoing and as best seen in FIGS. 2 and 3, filter element 10, instead of having a straight taper from nose 24 to its downstream exit end at the junction with mounting flange 32, has a bulbous configuration reaching a maximum diameter at apex 28 which is located approximately two thirds of the axial length of filter element 10 downstream from the leading edge or nose 24. Preferably, filter 10 is made of conventional cotton perforate filter media for essentially its entire axial length including the nose section 22.

Mounting flange 32 of filter element 10 is imperforate and may be made separately from the conical sections 22/26/30 of the filter element and bonded to the downstream edge of the same via suitable adhesive material. Alternatively, flange 32 may be formed in the manufacture of the perforate conical corrugated sections 22/26/30 so as to be joined integrally with the trailing edge of the trailing conical section 30, as described in more detail hereinafter.

In accordance with another principal feature of the present invention, filter housing 12 of the first embodiment device 8 is made of an imperforate flexible rubber material that offers a relatively high level of flexibility and shock resistance, and is primarily intended for use in naturally aspirated applications that typically have minimal pressure differentials between internal and ambient air pressure. The flexibility of housing 12 easily accommodates mounting variations encountered in vehicle installation of filtration device 8 when coupling to the mating elements in the vehicle, thereby readily accommodating such loose intake component location tolerances during factory installation of the filtration device.

Housing 12 comprises a cylindrical imperforate tubular wall inlet section 40 designed to telescopically receive the outlet end of the tubular conduit that is connected to a vehicle air intake scoop or the like, and is to be clamped on inlet 40 by hose clamp 20. The downstream end of tubular inlet 40 is integrally joined to a generally straight taper conical imperforate wall section 42 divergent in the downstream direction. Wall section 42 terminates at its outlet end at a maximum diameter apex 44 where it is integrally joined to a convergent trailing imperforate wall section 46 that, at its downstream [end] *outlet 49*, is joined to a radially outwardly extending annular mounting flange portion 48.

Mounting collar 18 comprises a radially outwardly extending circular mounting flange portion 50 seamlessly joined either integrally or by a suitable adhesive to a flexible annular collar boot section 52 that terminates at its downstream end in an annular mounting rib 54 adapted to be sealably abutted to the inlet of the engine intake manifold port. Gaskets 14 and 16 are flat rings made of suitable conventional gasket material. Gasket 14 is dimensioned at its I.D. to encircle the outlet [end] *51* of filter section 30 in assembly when held clamped between housing flange 48 and filter element flange 32. Gasket ring 16 is clamped between filter flange 32 and collar flange 50 in assembly, and its I.D. is designed to match that of flange 50 and flange 32, and likewise as to its O.D. A pair of headed fasteners 56 and 58 and cooperative threaded nuts 60 and 62 are inserted through associated mounting holes in flange 48, gasket 14, flange 32, gasket 16 and flange 50 to thereby clamp these components of the filter device 8 in assembled operative relationship as shown in FIG. 3 *wherein flange 32 closes up a downstream annular chamber 66*.

In accordance with another one of the principal features of the present invention, the surface shape of filter element 10, with its maximum diameter bulge located at apex 28, provides a greater surface area than a straight tapered conical shape having the same entrance and exit diameters, thereby increasing the total surface area so that the total air flow capacity of the filter element is significantly increased. This bulbous surface shape and consequent increase in surface area exposed to air flow combine to provide less flow resistance to the air passing through the filter media, and hence greater overall flow capacity for the filter device.

In accordance with another feature of the present invention, housing 12 has an interior surface configuration which, although generally [complimental] *complemental* to the exterior surface configuration of filter element 10, (i.e., being bulbous and maximizing its diameter at apex 44 in general radial alignment with apex 28 of the filter element 10), nevertheless has a taper angle in wall section 42 that is slightly convergent downstream with the taper angle of media wall sections 22 and 26 of filter element 10. Then, downstream of housing apex 44, the trailing housing wall section 46 is convergent in the downstream direction. Note also that housing wall section 46 has a taper angle convergent with that of filter wall section 30, with the incremental degree of convergence of the housing convergent with that of section 46 relative to filter section 30 being greater than that of the upstream housing section 42 relative to filter sections 22 and 26. As will be evident from FIG. 3, nose 24 of filter element 10 is spaced sufficiently downstream from the outlet of tubular housing section 40 to maintain this [complimentary] *complementary* surrounding convergent annular chamber relationship with housing 12.

Due to this geometric [complimental] *complemental* configuration between the perforate exterior surface of filter element 10 and the imperforate interior wall surface of housing 12, the air flow entering from inlet tube section 40 into [the] *a* generally conical expanding annular air space chamber 64 (defined between sections 22 and 26 of filter element 10 and wall section 42 of housing 12) is allowed to pass through the filter media throughout the axial extent of chamber 64. The slightly convergent relationship of the housing wall section 42 relative to the wall section 22 and 26 of filter 10 tends to maintain the air pressure outside the filter element substantially constant as it travels axially even though the chamber volume is increasing because it is diverging, and even though air is being lost from this chamber by passage through the filter media in the downstream direction. This effect is augmented downstream of the maximum diameter apex 28, 44 travel point due to the convergent air chamber 66 and the increasing convergence of the housing downstream wall section 46 relative to the filter element downstream wall section 30.

As is well known in the art, the volumetric mass air flow through an automotive air filter typically changes with engine rpm, and also pulsates in accordance with engine cylinder intake sequence cycles. This variable air flow typically causes changes in the interface incidence angles relative to the filter media surface of filter element 10 at different flow velocities. In accordance with a further feature of the invention, the foregoing geometrical variation between the exterior surfaces of the filter element 10 and the inside surfaces of housing 12 are specifically designed to accept multiple changes in flow direction under air flow velocity and pressure changes. The non-parallel cavity walls of the filter element 10 and housing 12 correct the path of the air flow during such fluctuation to thereby ensure maximum air flow at multiple velocities and interface angles, thereby greatly enhancing the operational efficiency of filter device 8. Due to these features, filter device 8 accomplishes an increasing air flow and air velocity compared to prior art devices, while maintaining a high level of air filtration. In operation the air filtration device 8 of the invention offers a lower level of air deflection due to the foregoing unique geometrical shape that creates several thousand direct paths for the air to flow through the filter media without significant deflection. Additionally, the filter housing shape enhances proper flow direction and thereby makes it possible to achieve higher flow-through air velocities than conventional air filtration devices. For example, the filter element 10 when configured by way of example as shown in FIGS. 1–3 and as described hereinabove, provides an approximately 20% increase in surface area to thereby provide the potential for approximately 20% more air flow in cubic feet per minute through device 8. This enhanced air flow capacity of filter device 8 also reduces the audible noise level associated with the air filtration device in operation because of the elimination of incorrect air to filter interface angles found in prior art devices.

Preferably filter element 10 is made from a layout on a flat sheet blank that has a maximum radius arc at the downstream peripheral edge and a minimum radius arc at the upstream peripheral edge that when unrolled, is similar to an unrolled tapered megaphone. The flat layout blank is then formed through cooperative meshing tapered forming dies that are suitably corrugated with a tighter pattern on the pointed end and a wider pattern on the exit end. When the sheet is rolled between these forming dies, the blank is progressively curved until the leading side edge is brought into registery with the trailing side edge to provide a generally conical shape in the overall form. These two side edges are suitably joined or seamed together. The corrugations are preferably V-shaped with rounded root and peak spices. The rolling dies can also be shaped to form the radially extending flange portion 32 of filter 10 as an integral downstream portion of the roll form. Rolling dies are, of course, suitably shaped to provide the finished bulbous configuration of the filter element illustrated in FIGS. 1–3.

The flexible rubber material of housing 12 offers a higher level of flexibility and shock resistance. This rubber based housing 12 is primarily used in a filter device 8 that is intended for naturally aspirated engine applications that typically have minimal negative internal air pressures relative to external ambient pressures. The flexibility of the rubber housing 12 makes it more easily adaptable to tolerance variations in the upstream and downstream mounting components of the vehicle to which it is to be attached.

The increased air flow capacity of unit 8 for filtering air is augmented by the streamlined shape of filter element 10 with its pointed nose 24 facing upstream so that the angle of incidence of the air stream is a very shallow angle relative to the exterior surface of filter element 10. Hence, a maximum extent of volumetric air flow-through can be accommodated with a minimum noise level and with less pressure drop through the filter media, thereby further contributing to the operational efficiency of the filter device 8. The increased surface area contributed by the bulbous shape and diametrical enlargement at the apex of the bulb provide less flow resistance and greater flow capacity in performance of the unit. The generally [complimental] *complemental* shape of the confining interior surface of housing 12 also enhances air flow and decreases turbulence in the air stream, further enhancing efficiency. Air velocity in the air stream is thereby increased and hence the flow rate through the filter likewise is increased. Turbulence and eddies also are reduced in the air stream as it impinges the surface of the filter element.

The increasing convergence in annular chamber 66 between the downstream section 46 of housing 12 and section 30 of filter 10 tends to force the diminished volume of air through the filter and reduces the bounce-back or reversal effect which might otherwise occur absent this relationship. In other words, in terms of what is dynamically occurring in the air flow incrementally, axially in the downstream direction, as the air stream progressively goes through the filter media, the higher volumetric flow rate goes from annular chamber 64, through the first and second conically divergent sections 22 and 26 of the filter media. Then the air stream remaining that flows back around and past apex 28 of filter 10 has less volume, but this is compensated for by the increasing convergence in the annular surrounding space of chamber 66 to thereby maintain force-through pressure in the air stream. The result of the effect of these compound convergent angles in the annular space flow chambers 64 and 66 defined between housing walls 42 and 46 and filter element 10 is to thereby get as much air through the filter as quickly as possible. In addition, the non-parallel [cavities] *chambers* 64 and 66 between filter 10 and housing 12 operate to correct the path of the air flow during pressure fluctuations to maintain a more uniform angle of incidence for entry of the air stream through the filter media despite mass volumetric air flow rate variations as well as pulsating effects. In this manner, the geometrical variation between the surface of filter 10 and the inside surface of housing 12 are specifically designed to accept multiple changes in flow direction under velocity pressure changes.

Figure 5:
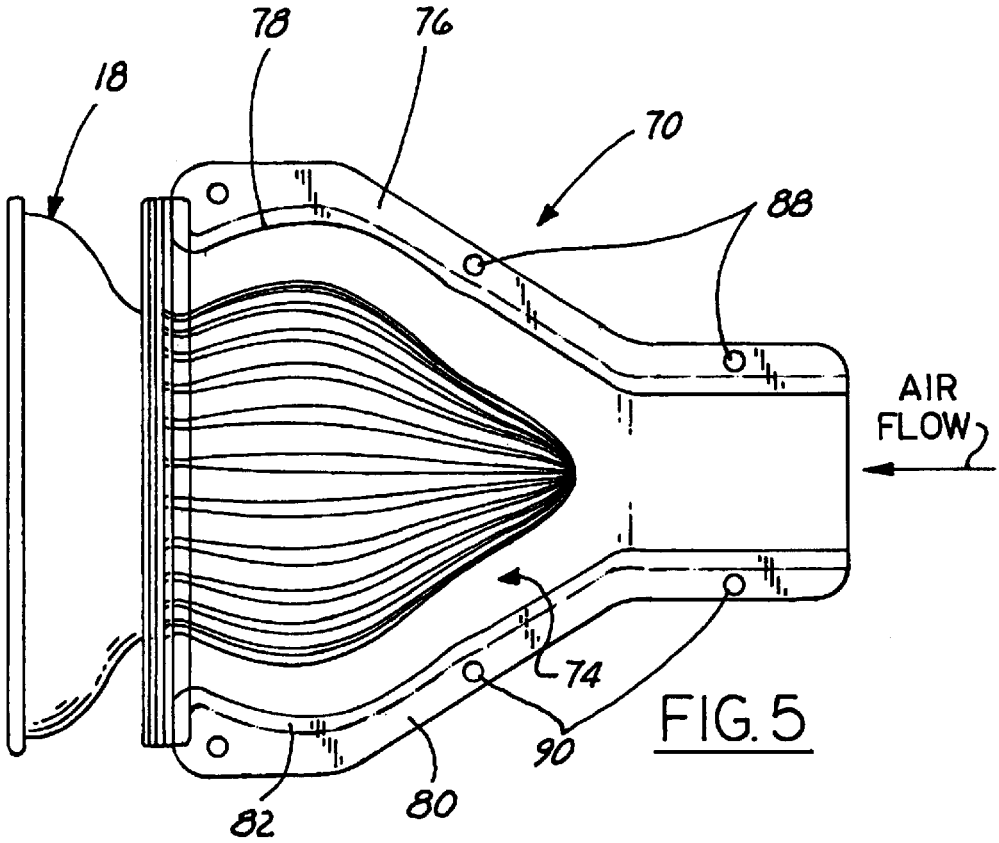
FIG. 5 is a view similar to FIG. 3 but showing the modified housing of FIG. 4 in assembly with the remaining components of the air filtration device illustrated in FIGS. 1 and 2.

It is to be noted that the volume of the chambers 64 and 66 on the scale shown in FIGS. 3 and 5 of the drawings is about 16 to 17% greater than the volume contained within filter 10. However, this ratio may be increased somewhat up to say about 20% greater volume of chambers 64 and 66 than the volume of filter 10. It is also to be understood that the geometric shape of housing 12, 70 is that of a venturi to achieve a pressure drop in the air filter of the housing, and the generally complemental shape of filter 10 enhances this effect while substantially reducing turbulence within the chambers 64 and 66.

It is also to be understood that confining the filter 10 within the complemental housing 12 with its entrance duct 40 facilitates conducting an air flow stream from one of several sources. Thus housing 12, in addition to enhancing the filtration performance of filter 10 while providing a protective enclosure for the same, also provides a convenient structure having sufficient strength to support the coupling or mounting via tubular inlet 40 to a variety of intake air duct configurations. Housing 12 with its tubular inlet 40 also provides a place to mount the typical mass air flow sensor associated with the typical electronic control unit (ECU) in an automotive installation. Conventional practice is to locate and mount such a mass air flow sensor downstream from an air filter. However in such locations the sensor is receptive to contamination from the oil swept by the filtered air stream from the oil coating conventionally provided on the filter media. This coating oil tends to migrate with the air stream off of the filter and then deposit onto the mass air flow sensor and thereby adversely affect the same. When this occurs it adversely alters the calibration of the mass air flow sensor, thereby causing a performance deterioration in the mass air flow sensor and its associated sensing and control system. However, with the strength, size and space provided by inlet 40 of housings 10 or 70 it is a relatively simple matter to provide a suitable mounting of a conventional mass air flow sensor unit in this tubular inlet where it is both housed and protected. Moreover, because the sensor is now upstream of the associated filter media 10, it is not subject to filter oil contamination. For example, a mass air flow sensor unit of typical construction is generally made in a flat, thin planar form and may be dimensioned so as to have its transverse dimension sized for slip or press fit inside of tubular inlet 40 so as to be supported by the wall of the tubular inlet 40 while presenting a minimum obstruction to air flow by having its major plane coincident with the axis of inlet 40. In such cases the exit sleeve of the feed duct to the filter unit would be sized to telescope onto the outside of inlet 40 and be held thereon by hose clamp 20, as described previously.

From the foregoing description and accompanying drawings, it will now be apparent to those of ordinary skill in the art that the improved air filtration device of the present invention amply fulfills and accomplishes one or more of the aforestated objects of the invention and provides many features and advantages over the prior art.

Second Embodiment

FIGS. 4 and 5 illustrate a second embodiment of a housing 70 that can be substituted for housing 12 in the assembly of filter unit 8. Housing 70 is a two-piece housing made up of identical but mirror image half sections 72 and 74, each provided with a radially outwardly extending flange 76 extending axially along one of the side edges 78 of half section 74 and a similar flange 80 extending axially along and radially outwardly from the other side edge 82 of section 74, as shown in FIG. 5. Similar flanges 84 and 86 are provided along the side edges of the other half section 72 of housing 70 (FIG. 4). The edge flanges 76, 80, 84 and 86 are provided with suitable fastener mounting openings and 88 and 90 are fastened together with suitable fasteners (not shown). Housing 70 may be injection molded from suitable plastic composition material designed for automotive under-the-hood applications so as to be rigid or semi-rigid and have a high temperature resistance. Housing 70 thus has the capability to handle a higher level of internal air pressures, whether negative or positive, relative to ambient pressure, such as is encountered in supercharged applications.

Except for the nature of the plastic material versus the flexible rubber material, housing 70 and housing 12 have the same geometrical configuration, same function and same mode of operation in cooperation with filter element 10 as described hereinabove.

From the foregoing description and accompanying drawings, it will now be evident that the improved air filtration method and device of the invention offers many advantages and can be applied to internal combustion engines of various types, such as those used in automobiles and trucks as well as smaller engines used on motorcycles and small engine vehicles, as well as marine craft, jet skis and the like. Moreover, the principles of the present invention are applicable more generally to filtering a variety of different types of gaseous fluids and even liquid fluids with corresponding improved results relative to prior art methods and devices employed for these purposes.

What is claimed is:

1. A method for filtering solid contaminants from a stream of flowing fluid comprising the steps of:

(1) providing a housing having a tubular inlet exiting at its downstream end into a conically divergent first imperforate housing conical wall section having a first taper angle of divergence in a downstream direction and terminating in a maximum diameter apex and then continuing in a conically convergent second imperforate housing conical wall section having a second taper angle of convergence and having an outlet opening of greater diameter than the diameter of the inlet opening of the first wall section at the tubular inlet, (2) providing a fluid-pervious filter element disposed within an interior chamber of the housing defined by said conical wall sections of the housing and having an exterior configuration generally [complimental] *complemental* to that of the interior chamber of the housing, said filter element comprising a first generally conical wall section divergent at a third taper angle of divergence juxtaposed to said housing first wall section and a second generally conical wall section convergent at a fourth taper angle of convergence juxtaposed to said housing second wall and extending axially downstream from a maximum diameter apex of the filter to an outlet of said filter element, and (3) orienting the housing and filter element relative to one another and to the flowing fluid stream to thereby cause the fluid to enter the housing inlet and then to flow axially along and between the filter element and housing and then radially inwardly through the filter element and then exit via the filter element outlet whereby solid contaminants are entrained on the exterior surface of the filter element.

2. The method of claim 1 wherein said third taper angle divergence of said filter element is slightly greater than said first taper angle of divergence of the housing to thereby define an annular space therebetween of frustoconical contour having a cross-sectional area that diminishes in the downstream direction of fluid flow.

3. The method of claim 2 wherein said second taper angle of convergence of said housing is greater than said fourth taper angle of convergence of said filter element.

4. The method of claim 3 wherein said fourth taper angle of convergence of the second wall section of said filter element is greater than the third taper angle of divergence of said first wall section of said filter element.

5. The method of claim 4 wherein said second taper angle of convergence of the convergent downstream second wall section of said housing is greater than said first taper angle of divergence of the upstream divergent first wall section of said housing.

6. The method of claim 5 wherein said housing is constructed of flexible rubbery material and is molded as a one-piece unit.

7. The method of claim 5 wherein said housing comprises a two-piece unit comprising half sections that mate together at mounting flanges along the side edges of each of the half sections, said housing being made of a plastic material having at least a semi-rigid characteristic sufficient to withstand substantial pressure differences in operation between that of the interior fluid flow stream and that of the exterior ambient air.

8. The method of claim 1 wherein the filter element is corrugated to provide axially extending radial corrugations generally uniformly around the entire circumference of the filter element and extending substantially for the entire axial length thereof.

9. The method of claim 8 wherein said filter element is made from a layout on a flat sheet blank that has a maximum radius arc at the downstream peripheral edge and a minimum radius arc at the upstream peripheral edge that when unrolled, is similar to an unrolled tapered megaphone wall, and wherein the flat layout blank is then formed through cooperative meshing tapered forming dies that are suitably corrugated with a tighter pattern on the pointed end and a wider pattern on the exit end, such that, when the sheet is rolled between these forming dies, the blank is progressively curved until the leading side edge is brought into registry with the trailing side edge to provide a generally conical shape in the overall form, and then these two side edges are suitably joined or seamed together.

10. The method of claim 9 wherein the corrugations are V-shaped with rounded root and peak spices.

11. The method of claim 10 wherein the forming dies are shaped to form a radially extending flange portion of filter as an integral downstream portion of the roll form.

12. The method of claim 11 wherein the forming dies are suitably shaped to provide a finished bulbous configuration of the filter element.

13. The method of claim 1 wherein the exterior surface of the filter element and the interior surface of the housing define therebetween an annular fluid flow chamber surrounding the filter element, and wherein the volume of said annular chamber is on the order of 15 to 20% greater than the volume defined within the interior surface of the filter element.

14. The method of claim 13 wherein the volume of said annular chamber is approximately 16 to 18% greater than the volume of the interior of the filter element.

15. A method for filtering solid contaminants from a stream of flowing fluid comprising the steps of:

(1) providing a housing having a tubular inlet exiting at its downstream end into an imperforate housing wall having an overall generally divergent shape in a downstream direction and having an outlet opening of greater diameter than that of an inlet opening at the tubular inlet, (2) providing a perforate filter element disposed within an interior chamber defined by the interior configuration of the housing wall and having an exterior configuration generally complemental to that of the interior of the housing wall such that said filter element has an overall generally divergent shape in the downstream direction, the exterior *configuration* of said filter element and the interior *configuration* of said housing wall defining therebetween a fluid flow chamber surrounding said filter element having a volume on the order of about 15 to about 20% greater than the interior volume of said filter element, and (3) orienting the housing and filter element relative to one another and to the flowing fluid stream to thereby cause the fluid to flow axially along and between the filter element and housing and then radially inwardly through the filter element and then exit via an outlet of said filter element outlet whereby solid contaminants are entrained on the exterior surface of the filter element.

16. The method of claim 15 wherein said filter element divergent shape has a divergence angle that is slightly greater than that of the divergent shape of said housing to thereby define therebetween and in said fluid flow chamber a fluid flow space surrounding said divergent shape of said filter and having a radial cross-sectional area that diminishes in the direction of fluid flow downstream.

17. The method of claim 15 wherein said filter element and said housing both have a bulbous cross-sectional shape [disposed more closely adjacent their respective downstream outlet ends than to their upstream ends so as to define in the downstream flow direction from an] *each having a respective* apex [of the bulbous section] *disposed more closely adjacent their respective downstream outlet ends than to their upstream ends and spaced from the downstream outlet ends so as to define in the downstream flow direction* a convergent shape.

18. The method of claim 15 wherein the fluid flow chamber is blocked at its downstream end so that the only exit for the fluid flowing into the fluid flow chamber is by penetrating through and into the filter element and thence via the outlet of the filter element.

19. The method of claim 18 wherein the housing tubular inlet has an imperforate tubular wall inlet section upstream of the upstream end of the filter element within the housing adapted to telescopically receive the outlet of an associated fluid feed duct for feeding fluid from a fluid intake source into the housing of the filter element.

20. A filtration device for filtering solid contaminants from a stream of flowing fluid comprising a housing having a tubular inlet exiting at its downstream end into a conically divergent first imperforate housing conical wall section having a first taper angle of divergence in a downstream direction and terminating in a maximum diameter apex and then continuing in a conically convergent second imperforate housing conical wall section having a second taper angle of convergence and having an outlet opening of greater diameter than the diameter of the inlet opening of the first wall section at the tubular inlet, and a fluid-pervious filter element disposed within [the] *an* interior chamber defined by said conical wall sections of the housing and having an exterior configuration generally [complimental] *complemental* to that of the interior *conical wall sections* of the housing, said filter element comprising a first generally conical wall section divergent at a third taper angle of divergence and being juxtaposed to said housing first wall section and a second generally conical wall section convergent at a fourth taper angle of convergence and being juxtaposed to said housing second wall section and extending axially downstream from a maximum diameter apex of said filter element to an outlet of said filter element.

21. The filtration device of claim 20 wherein said third taper angle of divergence of said filter element is slightly greater than said first taper angle of divergence of the housing to thereby define an annular space therebetween of frustoconical contour having a cross-sectional area wherein the difference between the I.D. and O.D. thereof diminishing in the direction of fluid flow downstream.

22. The filtration device of claim 21 wherein said second taper angle of convergence of said housing is greater than said fourth taper angle of convergence of said filter element.

23. The filtration device of claim 22 wherein said fourth taper angle of convergence of the downstream second wall section of said filter element is greater than the third taper angle of divergence of said first wall section of said filter element.

24. The filtration device set forth in claim 23 wherein said second taper angle of convergence of the convergent downstream second wall section of said housing is greater than said first taper angle of divergence of the upstream divergent first wall section of said housing.

25. The filtration device of claim 24 wherein said housing is constructed of flexible rubbery material and is molded as a one-piece unit.

26. The filtration device of claim 24 wherein said housing comprises a two-piece unit comprising half sections that mate together at mounting flanges along the side edges of each of the half sections, said housing being made of a plastic material having at least a semi-rigid characteristic sufficient to withstand substantial pressure differences in operation between that of the interior fluid flow stream and that of the exterior ambient air.

27. The filtration device of claim 20 wherein the filter element is corrugated to provide axially extending radial corrugations generally uniformly around the entire circumference of the filter element and extending substantially for the entire axial length thereof.

28. The filtration device of claim 20 wherein the exterior surface of the filter element and the interior surface of the housing define therebetween an annular fluid flow chamber surrounding the filter element, and wherein the volume of said annular chamber is on the order of 15 to 20% greater than the volume defined within the interior surface of the filter element.

29. The filtration device of claim 28 wherein the volume of said annular chamber is approximately 16 to 18% greater than the volume of the interior of the filter element.

30. A filtration device for filtering solid contaminants from a stream of flowing fluid comprising a housing having a tubular inlet exiting at its downstream end into an imperforate housing wall having an overall generally divergent shape in a downstream direction and having an outlet opening of greater inside diameter than that of an inlet opening at the tubular inlet, and a perforate filter element disposed within an interior chamber defined by the interior configuration of the housing wall and having an exterior configuration generally complemental to that of the interior configuration of the housing wall such that said filter element has an overall generally divergent shape in the downstream direction, the exterior outside diameter (O.D.) of said filter element and the interior inside diameter (I.D.) of said housing defining therebetween an annular air flow chamber surrounding said filter element having a volume on the order of about 15 to about 20% greater than the interior volume of said filter element.

31. The filtration device of claim 30 wherein the divergence angle of said filter element is slightly greater than that of said generally divergent shape of said housing wall to thereby define therebetween and in said annular flow chamber a fluid flow space surrounding said filter and having a radial cross-sectional area wherein the difference between said I.D. and O.D. thereof diminishes in the direction of fluid flow downstream.

32. The filtration device of claim 30 wherein said filter element and said housing both have a bulbous cross-sectional shape [disposed more closely adjacent their respective downstream outlet ends than to their upstream ends so as to define from an] *each having a respective* apex [of the bulbous section] *disposed more closely adjacent their respective downstream outlet ends than to their upstream ends and spaced from the downstream outlet ends so as to define* a convergent shape in the downstream flow direction.

33. The filtration device of claim 30 wherein the annular fluid flow chamber is blocked at its downstream end so that the only exit for the fluid flowing into the fluid flow chamber is by penetrating through and into the filter element and thence via the outlet of the filter element.

34. The filtration device of claim 33 wherein said housing tubular inlet has an imperforate tubular wall inlet section upstream of the upstream end of the filter element within the housing adapted to telescopically receive the outlet of an associated fluid feed duct for feeding fluid from a fluid intake source into the housing of the filter element.

35. The filtration device of claim 34 wherein said tubular wall inlet section of said housing tubular inlet has a mass fluid flow sensor mounted therein.

36. The filtration device of claim 30 wherein said housing is constructed of flexible rubbery material and is molded as a one-piece unit.

37. The filtration device of claim 30 wherein said housing comprises a two-piece unit comprising half sections that mate together at mounting flanges along the side of edges of each of the half sections, said housing being made of a plastic material having at least a semi-rigid characteristic sufficient to withstand in operation substantial pressure differences between that of the interior fluid flow stream and that of the exterior ambient air.

38. The filtration device of claim 30 wherein the filter element is corrugated to provide axially extending radial corrugations generally uniformly around the entire circumference of the filter element and extending substantially for the entire axial length thereof.

*39. A filtration device for filtering solid contaminants from a stream of flowing fluid comprising a housing having a first fluid flow opening with the housing having an overall divergent shape from the first fluid flow opening toward a second fluid flow opening of greater inside diameter than the first fluid flow opening, and a perforate filter element disposed within an interior chamber defined by an interior configuration of the housing and having an exterior configuration generally complemental to that of the interior configuration of the housing such that said filter element has an overall generally divergent shape toward the second fluid flow opening, said filter element having an exterior outside dimension and said housing having an interior inside dimension defining therebetween a fluid flow chamber surrounding said filter element and having a cross-sectional area wherein the difference between said interior inside dimension and said exterior outside dimension diminishes in the direction from said first fluid flow opening to said second fluid flow opening.*

*40. The filter device of claim 39 wherein said filter element and said housing both have a bulbous cross-sectional shape each having a respective apex disposed more closely adjacent the respective second fluid flow opening than to the first fluid flow opening and spaced from the respective second fluid flow opening so as to define a convergent shape from the apex to the second fluid flow opening.*

*41. The filter device of claim 39 wherein the fluid flow chamber is closed in proximity to the second fluid flow opening so that the only path for fluid flowing through the fluid flow chamber is by penetrating through the filter element between the first and second fluid flow openings of said housing.*

*42. A filtration device for filtering solid contaminants from a stream of flowing fluid comprising a housing having a tubular first fluid flow opening exiting at one axial end into a conically divergent first imperforate housing conical wall section having a first taper angle of divergence in an axial direction and terminating in a maximum diameter apex and then continuing in a conically convergent second imperforate housing conical wall section having a second taper angle of convergence and having an axial opposite second fluid flow opening of greater diameter than the diameter of the first fluid flow opening of the first wall section and a fluid-pervious filter element disposed within an interior chamber defined by said conical wall sections of the housing and having an exterior configuration generally complemental to that of the conical wall sections of the housing, said filter element comprising a first generally conical wall section divergent at a third taper angle of divergence and being juxtaposed to said housing first wall section and a second generally conical wall section convergent at a fourth taper angle of convergence and being juxtaposed to said housing second wall section and extending axially from a maximum diameter apex of said filter element to a fluid flow opening of said filter element.*

*43. The filter device of claim 42 wherein the fluid flow chamber is closed in proximity to the second fluid flow opening so that the only path for fluid flowing through the fluid flow chamber is by penetrating through the filter element between the first and second fluid flow openings of said housing.*

*44. A method for filtering solid contaminants from a stream of flowing fluid comprising the steps of:*

*(1) providing a housing having a first fluid flow opening exiting at one end into an imperforate housing wall having an overall generally divergent shape toward a second fluid flow opening of greater diameter than that of an first fluid flow opening,*

*(2) providing a perforate filter element disposed within an interior chamber defined by the interior configuration of the housing wall and having an exterior configuration generally complemental to that of the interior configuration of the housing wall such that said filter element has an overall generally divergent shape toward the second fluid flow opening, the exterior configuration of said filter element and the interior configuration of said housing wall defining therebetween a fluid flow chamber surrounding said filter element having a radial cross-sectional area that diminishes in the direction of said second fluid flow opening, and*

*(3) orienting the housing and filter element relative to one another and to the flowing fluid stream to thereby cause the fluid to flow between the first and second fluid flow openings, axially along and between the filter element and housing, and radially through the filter element whereby solid contaminants are entrained on the filter element.*

*45. The method of claim 44 wherein the fluid flow chamber is blocked near the second fluid flow opening and the only path for the fluid flowing through the fluid flow chamber is by penetrating through the filter element between the first and second air flow openings.*

* * * * *

UNITED STATES PATENT AND TRADEMARK OFFICE

CERTIFICATE OF CORRECTION

PATENT NO. : RE 40,481 E
APPLICATION NO. : 11/586490
DATED : September 9, 2008
INVENTOR(S) : Alexander Borla It is certified that error appears in the above-identified patent and that said Letters Patent is hereby corrected as shown below:

On the Cover Page:

After "(22) Filed: Oct. 25,", insert --2006--
Delete Next Line "(22) Filed: 2006"

In the Claims:
Claim 10, Col. 10, Line 4 - delete "spices", insert --apices--

Signed and Sealed this

Twenty-third Day of December, 2008

JON W. DUDAS
*Director of the United States Patent and Trademark Office*